US009777120B2

(12) United States Patent
Schurek et al.

(10) Patent No.: US 9,777,120 B2
(45) Date of Patent: Oct. 3, 2017

(54) ALKOXYALKYLSILANE-MODIFIED POLYSILOXANES AND PROCESSES FOR THE PRODUCTION THEREOF

(71) Applicant: CHT R. Beitlich GmbH, Tübingen (DE)

(72) Inventors: Petr Schurek, Burladingen/Killer (DE); Friedhelm Nickel, Tübingen (DE)

(73) Assignee: CHT R. BEITLICH GMBH, Tubingen (DE)

( * ) Notice: Subject to any disclaimer, the term of this patent is extended or adjusted under 35 U.S.C. 154(b) by 0 days.

(21) Appl. No.: 14/680,666

(22) Filed: Apr. 7, 2015

(65) Prior Publication Data
US 2015/0291739 A1   Oct. 15, 2015

(30) Foreign Application Priority Data

Apr. 11, 2014 (DE) .................. 10 2014 206 991

(51) Int. Cl.
| C08G 77/18 | (2006.01) |
| C09D 183/14 | (2006.01) |
| C08G 77/50 | (2006.01) |
| C09J 183/14 | (2006.01) |
| C09D 183/04 | (2006.01) |
| C09J 183/04 | (2006.01) |
| C08G 77/12 | (2006.01) |
| C08G 77/20 | (2006.01) |
| C08G 77/08 | (2006.01) |

(52) U.S. Cl.
CPC ............. *C08G 77/18* (2013.01); *C08G 77/50* (2013.01); *C09D 183/04* (2013.01); *C09D 183/14* (2013.01); *C09J 183/04* (2013.01); *C09J 183/14* (2013.01); *C08G 77/08* (2013.01); *C08G 77/12* (2013.01); *C08G 77/20* (2013.01)

(58) Field of Classification Search
None
See application file for complete search history.

(56) References Cited

U.S. PATENT DOCUMENTS 4,772,675 A    9/1988  Klosowski et al.

FOREIGN PATENT DOCUMENTS

WO    WO 2013/037105    *    3/2013

OTHER PUBLICATIONS

Petar R. Dvornic et al., "Polymerization by Hydrosilation", Macromolecules 1994, pp. 1068-1070, vol. 12, No. 4, American Chemical Society.

* cited by examiner

*Primary Examiner* — Marc Zimmer
(74) *Attorney, Agent, or Firm* — Seth L. Hudson; Clements Bernard Walker PLLC

(57) ABSTRACT

The present invention relates to alkoxyalkylsilane-modified polysiloxanes, to processes for the production thereof, and to the use thereof.

12 Claims, 1 Drawing Sheet

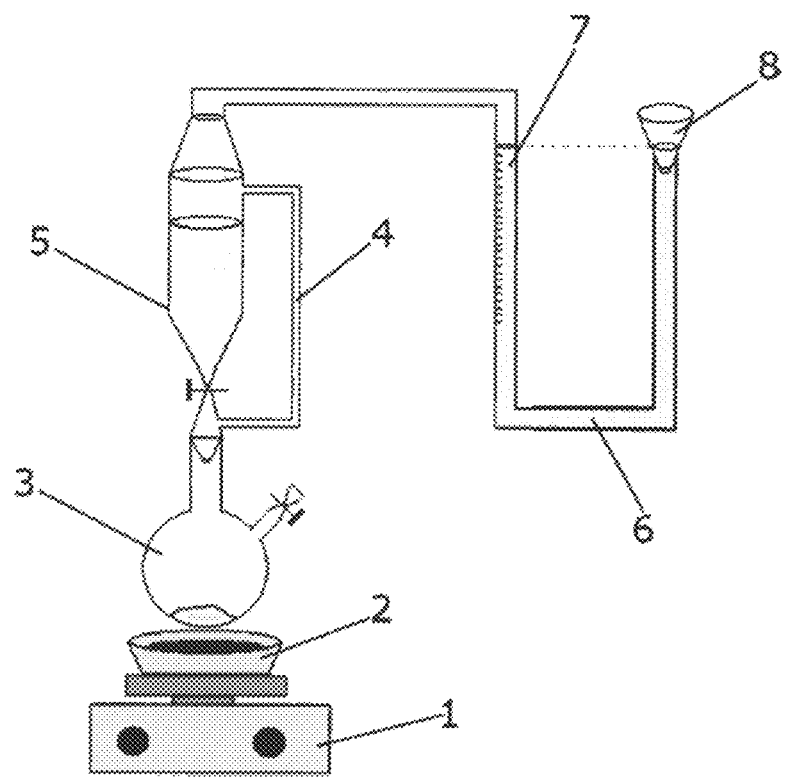

ALKOXYALKYLSILANE-MODIFIED POLYSILOXANES AND PROCESSES FOR THE PRODUCTION THEREOF

FIELD OF THE INVENTION

The present invention relates to alkoxyalkylsilane-modified polysiloxanes, to processes for the production thereof, and to the use thereof.

BACKGROUND

Polysiloxanes, or chemically more exactly polyorganosiloxanes, are often referred to as silicones in everyday language. They belong to a group of synthetic polymers in which silicon atoms are linked together through oxygen atoms. Because of their typically inorganic skeleton on the one hand and the organic radicals on the other, polysiloxanes take an intermediate position between inorganic and organic compounds. In some way, they are hybrids and therefore have a unique range of properties, which is based, among other things, on the heat resistance and/or cold resistance as well as the electric properties of the polysiloxanes.

Processes for producing alkoxy-modified siloxanes with low viscosities are extensively described in the prior art. In these processes, triethoxy-modified siloxanes are reacted with alkoxyvinylsilanes by the direct hydrosilylation of siloxanes having a reactive Si—H group. This process is suitable, in particular, for producing polysiloxanes with low molecular weights of up to 15,000 g/mol. However, with increasing molecular weight, it becomes more difficult to achieve complete conversion of the starting materials by means of direct hydrosilylation. Polysiloxanes having a molecular weight of 50,000 g/mol or more are very difficult to produce in this way.

Polysiloxanes having an average molecular weight of up to 20,000 g/mol and a viscosity at 20° C. of about 1,500 mPa·s can be produced by equilibration processes known in the prior art. However, the reaction products obtained often have a high proportion of volatile components, which are undesirable in many applications, for example, in the electrical industry, because they may deposit on contact surfaces and thus cause failures. In order to counteract this phenomenon, the volatile components are usually substantially removed by distillation. Now, it is the object of the present invention to provide an alkoxysilane-modified polysiloxane that is obtained without a distillation step for purification. Another object is to provide a process for producing alkoxyalkylsilane-modified polysiloxanes that avoids the drawbacks of the prior art.

SUMMARY OF THE INVENTION

The invention relates to an alkoxyalkyl silane-modified polysiloxane of Formula P and a process for producing an alkoxyalkylsilane-modified polysiloxane having high optical clearness. The polysiloxane may be an oil, a fat, or a rubber-like compound. The process calls for a first organosiloxane contacting a second organosiloxane that has a reactive SiH group, said contacting occurring in the presence of an alkoxyvinylsilane. Employing this process does not require a purification by distillation step. The process does require apparatus for determining hydrogen content, such as that shown in FIG. 1.

BRIEF DESCRIPTION OF THE DRAWING

FIG. 1 shows equipment set up to demonstrate apparatus for determining the hydrogen content during the production process of the present invention.

DESCRIPTION OF THE PREFERRED EMBODIMENTS

In a first embodiment, the object of the present invention is achieved by an alkoxyalkylsilane-modified polysiloxane of the following general formula P:

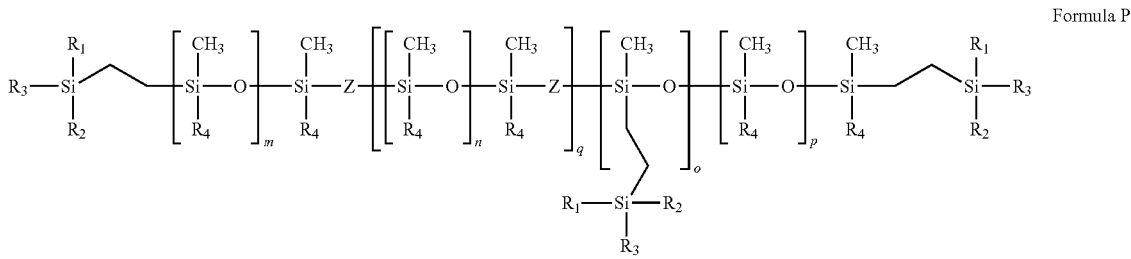

Formula P in which, independently of one another:

$R_1$ represents $R_2$ or $OR_5$, wherein $R_5$ is a hydrogen (H) atom or a linear or branched, saturated or unsaturated, optionally substituted hydrocarbon radical with 1 to 8 carbon atoms, in particular, $R_5$ represents a monovalent hydrocarbon radical with 1 or 2 carbon atoms;

$R_2$ represents $R_1$ or an oxime radical of formula —O—N=C—$R_7$, wherein $R_7$ is a linear hydrocarbon radical with 4 carbon atoms, or a cyclic hydrocarbon radical with 6 carbon atoms;

$R_3$ is $R_1$ or $R_2$ or a monovalent SiC-bonded saturated hydrocarbon radical with 1 to 8 carbon atoms, or a hydrocarbon radical with a terminal carbon-carbon double bond with 2 carbon atoms;

$R_4$ is an aliphatic hydrocarbon radical with 1 to 30 carbon atoms, a phenyl radical, and/or a polyether radical of general formula $(CH_2)_3O(C_2H_4O)_w(C_3H_6O)_x(C_4H_8O)_yQ$, in which w, x, y are independently the same or different and respectively represent a number from 0 to 50; and Q represents a hydrogen atom or an aliphatic hydrocarbon radical with 1 to 4 carbon atoms;

Z is a divalent SiC-bonded saturated hydrocarbon radical with 2 carbon atoms;

m is an integer of from 1 to 200, especially from 1 to 100, especially from 1 to 50;

n is an integer of from 1 to 1000, especially from 1 to 500, especially from 1 to 200;

o is an integer of from 0 to 50, especially from 0 to 20, especially from 0 to 10;

p is an integer of from 1 to 50, especially from 1 to 20, especially from 1 to 10;

q is an integer of from 1 to 50, especially from 1 to 20, especially from 1 to 10.

Surprisingly, it has been found that corresponding polysiloxanes, especially those having a viscosity of from 200 mPa·s to 1,000,000 mPa·s at 20° C., can be obtained with a high optical clearness. The alkoxyalkylsilane-modified polysiloxanes according to the present invention may be oils or fats, or even rubber-like compounds.

In the polysiloxane according to the invention, the radical $R_1$ may have the meaning of $R_2$. Further, $R_1$ may have the meaning of $OR_5$, wherein $R_5$ is a hydrogen atom or a linear or branched, saturated or unsaturated, optionally substituted hydrocarbon radical with 1 to 8 carbon atoms. To the extent where they are at different positions in the molecule, the radicals $R_1$ indicated in formula P may independently take the respective definition. Preferably, the radical $R_1$ is identical within the polysiloxane of general formula P.

If $R_1$ is a hydrocarbon radical with 1 to 8 carbon atoms, it may be linear or branched according to the invention. Also, it is possible to employ a saturated or unsaturated hydrocarbon radical. The hydrocarbon radical may be substituted. Examples of substituted radicals $R_5$ include haloalkyl radicals, such as a 3-chloropropyl radical. Fluorine, bromine or iodine may also be employed as halogen atoms instead of chlorine. Preferably, $R_5$ is a monovalent hydrocarbon radical with 1 or 2 carbon atoms.

Independently of $R_1$, the radical $R_2$ in general formula P may have the same meaning as $R_1$. $R_2$ may also be an oxime radical of formula —O—N=C—$R_7$. The radical $R_3$ may have the same meaning as $R_1$ and/or $R_2$. In addition, $R_3$ may also represent a monovalent SiC-bonded saturated hydrocarbon radical with 1 to 8 carbon atoms, or a hydrocarbon radical with a terminal carbon-carbon double bond with 2 carbon atoms. Examples of corresponding unsaturated radicals include, in particular, alkenyl radicals, such as a vinyl radical. According to the invention, it is possible that $R_2$ and $R_3$ may independently take different meanings to the extent where the radicals occur at different positions within the molecule of general formula P, as set forth above with respect to $R_1$. Preferably, the radical $R_2$ is the same within the polysiloxane according to the general formula P. Also, the radical $R_3$ preferably has the same meaning within formula P.

Also $R_4$, which is an aliphatic hydrocarbon radical with 1 to 30 carbon atoms, a phenyl radical, and/or a polyether radical of general formula $(CH_2)_3O(C_2H_4O)_w(C_3H_6O)_x(C_4H_8O)_yQ$, may have the same or different meanings within the molecule of general formula P. Preferably, the radical $R_4$ is the same radical in each occurrence in the total molecule.

In another embodiment, the object of the present invention is achieved by a process for producing alkoxyalkylsilane-modified polysiloxanes, in which a first organosiloxane (a) with two or more terminal aliphatic unsaturated reactive groups and a second organosiloxane (b) with at least one reactive SiH group are contacted with one another in the presence of an alkoxyvinylsilane (c) having a terminal aliphatic unsaturated reactive group.

The process according to the invention enables the production of alkoxyalkylsilane-modified polysiloxane oils or rubber-like compounds with a viscosity of from 200 mPa·s to 1,000,000 mPa·s at 20° C. In the process, three mutually different organosiloxanes are contacted with one another. Both the first organosiloxane (a) and the alkoxyvinylsilane (c) have an aliphatic unsaturated reactive group. The first organosiloxane (a) differs from the alkoxyvinylsilane (c) in that the first organosiloxane (a) has two terminal aliphatic unsaturated reactive groups. Thus, the first organosiloxane (a) serves as a chain extender in the preparation of the polysiloxane according to the invention. In contrast, the alkoxyvinylsilane (c) has only one terminal aliphatic unsaturated reactive group. By controlling the proportion of alkoxyvinylsilane (c) in the reaction mixture for producing the polysiloxane according to the invention, the chain length of the final product to be obtained can be controlled.

Surprisingly, it has been found that, in particular, a ratio of aliphatic unsaturated reactive groups to the number of SiH bonds within a range of from 1.5:1 to 0.5:1, especially 1.2:1, and especially 1:1, leads to a desired product. The amount of aliphatic unsaturated reactive groups corresponds to the groups that are contained in both the first organosiloxane (a) and the alkoxyvinylsilane (c). The ratio according to the invention enables the reactive SiH bonds of the second organosiloxane (b) to react completely. Thus, a complete or at least almost complete reaction of the starting materials with one another takes place. The product obtained preferably does not contain any liquid components in the form of starting materials.

Further purification by distillation of the product obtained by the process according to the invention is not necessary, especially if the ratio of aliphatic unsaturated reactive groups to SiH bonds is within the range according to the invention. At this ratio, a complete reaction of the starting materials takes place, whereby a highly viscous polysiloxane that is an optically clear product with a high proportion of solids is obtained. The solids proportion of the polysiloxane obtained is, in particular, at least 99.5% by weight, and preferably 100% by weight. The solids proportion can be determined by gravimetric infrared drying. Infrared drying can be effected in a Moisture Analyzer. Thus, for example, an empty aluminum weighing dish is placed into the sample dish holder of a Mettler Toledo Halogen Moisture Analyzer HG 53, sea sand is sprinkled over it, and the unladen weight is read. 1.0 g of product (alkoxysilane-modified polysiloxane) is uniformly applied to the dish. After start of the program, the sample is heated to 140° C. After the mass has remained constant for 30 seconds, the measuring process is complete, the sample drawer is automatically moved out, and the solids proportion as a result is indicated and can be printed.

The first organosiloxane (a) is preferably an alkene-substituted polydiorganosiloxane, especially a dimethylsiloxane with terminal vinyl and/or allyl and/or hexenyl groups bonded to silicon. More preferably, it is a molecule of the following general formula A:

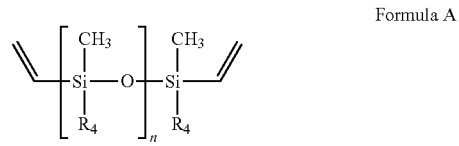

Formula A in which
$R_4$ is an aliphatic hydrocarbon radical with 1 to 30 carbon atoms, a phenyl radical, and/or a polyether radical of general formula $(CH_2)_3O(C_2H_4O)_w(C_3H_6O)_x(C_4H_8O)_yQ$, in which w, x, y are independently the same or different and respectively represent a number from 0 to 50; and Q represents a hydrogen atom or an aliphatic hydrocarbon radical with 1 to 4 carbon atoms; and n is a whole natural number of from 1 to 1000, especially from 1 to 500, especially from 1 to 200.

The molecular weight of the first organosiloxane (a) is not limited and can be chosen freely. Preferably, it is a liquid organosiloxane with a viscosity at 20° C. within a range of from 200 mPa·s to 1,000,000 mPa·s. However, it may also be a rubber-like compound with a high viscosity at 20° C. within a range of from 200,000 mPa·s to 1,000,000 mPa·s. Such a rubber-like compound usually has a degree of polymerization of from 3,000 to 10,000. The degree of polymerization means the number of monomer units in one polymer molecule. More preferably, the first organosiloxane (a) is a dimethylsiloxane with terminal dimethylvinyl groups having a viscosity within a range of from 200 mPa·s to 50,000 mPa·s at 20° C.

The alkoxyvinylsilane (c) is preferably represented by the general formula C.

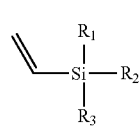

Formula C in which $R_1$ and $R_2$ have the same meaning as set forth with respect to formula P, and $R_3$ is an aliphatic unsaturated group.

The second organosiloxane (b) has, in particular, one or more terminal and/or pendant reactive SiH groups. Preferably, it has two or more reactive SiH groups. In particular, it is a molecule according to the following general formula B:

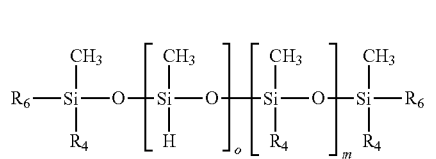

Formula B in which, independently of one another:

$R_4$ is an aliphatic hydrocarbon radical with 1 to 30 carbon atoms, a phenyl radical, and/or a polyether radical of general formula $(CH_2)_3O(C_2H_4O)_w(C_3H_6O)_x(C_4H_8O)_yQ$, in which w, x, y are independently the same or different and represent a number from 0 to 50; and Q represents a hydrogen atom or an alkyl radical with 1 to 4 carbon atoms;

$R_6$ is a hydrogen atom or a methyl radical;

m is an integer of from 1 to 200, especially from 1 to 100, especially from 1 to 50; and o is an integer of from 0 to 50, especially from 0 to 20, especially from 0 to 10.

According to the invention, the second organosiloxane (b) may have one or more pendant SiH groups. Also, it is possible that it has one or more terminal SiH groups. The presence of both one or more pendant and one or more terminal SiH groups is also possible according to the invention. In this case, the selection of the position of the SiH groups determines whether the product obtained is linear or branched.

The process according to the invention is preferably performed in the presence of a catalyst (d). In particular, the catalyst (d) is a hydrosilylation catalyst that includes platinum. Suitable catalysts include, for example, fluoroplatinic acid, platinum acetylacetonate, complexes of platinum halides with unsaturated compounds, such as ethylene, propylene, organovinylsiloxanes or styrene, hexamethyldiplatinum, $PtCl_2 \times PtCl_3$, or $Pt(CN)_3$. More preferably, the catalyst (d) includes complex compounds of platinum compounds with vinylsiloxane.

Preferably, the catalyst (d) is employed in such an amount that the proportion of platinum is from 1 to 100 ppm, especially from 1 to 10 ppm. This amount is sufficient to catalyze the reaction described above, especially at room temperature. Larger amounts of catalyst (d) would only increase the cost of the process. The proportion in ppm is expressed in ppm by weight. One ppm platinum means that one gram of platinum is employed, based on one thousand kilograms of reaction mixture consisting of the first organosiloxane (a), the second organosiloxane (b), and the alkoxyvinylsilane (c).

In particular, the process according to the invention is performed at a temperature within a range of from −20° C. to 200° C., especially from 10° C. to 120° C., more preferably from 40° C. to 100° C. At such temperatures, the catalyst (d) according to the invention, which may be Karstedt's catalyst, in particular, is particularly active. Therefore, the reaction according to the invention is catalyzed quickly, and the desired product, which is a colorless, optically clear polymer in the form of a polysiloxane, is obtained within a short time.

Preferably, no more active hydrogen-silicon bonds are found in polysiloxanes produced according to the invention. In particular, the proportion of active hydrogen-silicon bonds is zero. In order to determine the hydrogen content from H—Si bonds in the polysiloxanes according to the invention, a particular amount of the polysiloxane is placed into a round-bottom flask and weighed. After the flask is placed below a dropping funnel with a gas line, the excess pressure produced is relaxed through a second neck by opening a stopcock.

Thereafter, the stopcock is closed again. Through a dropping funnel, a 10% solution of KOH in butanol is added in excess. The following reaction ensues:

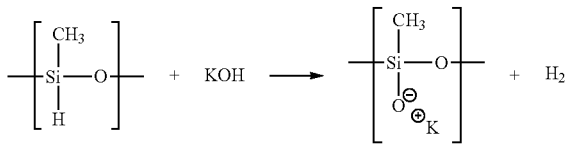

The generated hydrogen is passed through a gas line bypassing the stopcock of the dropping funnel, where it produces excess pressure. This excess pressure displaces a concentrated KCl solution in a volume measuring column connected thereto, and thus the generated volume of $H_2$ is measured. It is to be taken care that the level in the measuring column at the beginning is exactly at zero, and that a level compensation between the meniscus in the measuring column and the meniscus in the funnel at the end of the flexible tube for filling the column is always effected when reading the volume in order not to produce any pressure difference because of the levels of the water columns.

Thus, the hydrogen content is calculated as follows:

The ideal gas law applies: $p*V=n*R*T$ where
p=pressure (current measured value) [Pa]
V=volume (measured value) [ml]
n=amount in moles=m/M=mass [g]/molecular mass [g/mole]
R=ideal gas constant=8.3144621 J/(mol*K)
T=temperature in K
Therefrom, it follows that:

$$p * V(H_2) = \frac{m(H_2)}{M(H_2)} * R * T \longrightarrow$$

$$m(H_2) = \frac{p * V(H_2) * M(H_2)}{R * T}$$

$$H\% = \frac{m(H_2)}{2 * m_{\text{weight of sample}}} * 100\%$$

FIG. 1 schematically shows an appropriate apparatus for determining the hydrogen content. The magnetic stirrer is designated by 1. In the water bath for cooling 2, there is the round-bottom flask 3, which contains the polysiloxane and a stir bar. A pressure equalization can be effected through gas line 4, which is connected to the dropping funnel 5. The dropping funnel 5 contains a 10% KOH in butanol solution. The generated hydrogen gas is passed through a flexible tube 6 filled with concentrated KCl solution. At the volume measuring column 7, the generated volume of $H_2$ can be measured. At the end of flexible tube 6, there is a compensation vessel 8 for level compensation.

The viscosity of the polysiloxanes and organosiloxanes can be determined with a Brookfield viscometer RVTDV II. The measurement is effected at 20° C. Values of viscosity stated in the present description are each based on a temperature of 20° C. unless stated otherwise.

The determination of the average molecular weight of the polysiloxanes or organosiloxanes was effected by means of GPC (gel permeation chromatography). Toluene was used as the mobile phase. The flow rate was 1.0 ml per minute at a pressure of 100 bar and at a temperature of 30° C. For the determination, 3 g of the polymer or oligomer was dissolved in one liter of toluene. A polydimethylsiloxane (PDMS) standard from the company PSS in a molecular weight range of from 311 to 381,000 g/mole was employed for calibration.

The polysiloxane according to the invention can be employed, in particular, in room temperature curing silicone adhesives, silicone sealants and silicone coating agents.

EXAMPLES

Example 1

Into a round-bottom flask with a magnetic stir bar, a thermometer and a reflux condenser, 915.66 g of a vinylsiloxane polymer with a terminal vinyl group and an average molecular weight of 31,000 g/mole, a viscosity of 1,000 mPa·s and a solids content of 99.5% was filled at 140° C. This amount of 915.66 g corresponds to 2 moles. To the vinylsiloxane polymer, there were added 79.37 g of an organosiloxane (3 moles) with terminal H—Si bonds having an average molecular weight of 816 g/mole, a viscosity of 15 mPa·s and a hydrogen content of 1,400 ppm, and 4.87 g of vinyltrimethoxysilane (2 moles) having a molecular weight of 148 g/mole. The mixture obtained was heated at 50° C. Subsequently, 3 ppm platinum in the form of Karstedt's catalyst was added. The temperature was increased to 90° C. At this temperature, the mixture was stirred for one hour. Subsequently, the reaction mixture was cooled down to room temperature. The hydrogen content of the product obtained was determined in view of H—Si bonds. The hydrogen content was zero. Thus, the hydrosilylation was complete.

The polymer obtained had a molecular weight of 65,000 g/mole (determined by means of GPC), a solids content of 99.8% by weight, and a viscosity of 12,500 mPa·s at 20° C. In addition, the product obtained was clear. The polymer was in the form of a gel and corresponded to the following general formula 1:

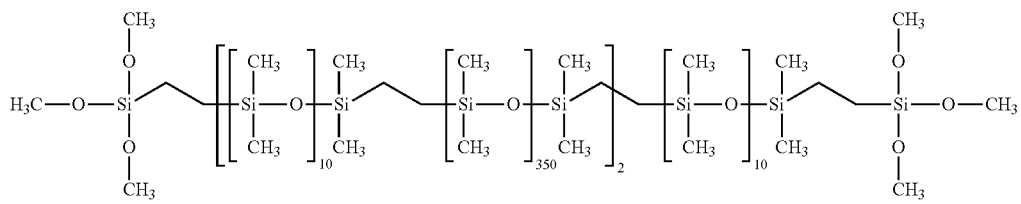

Example 2

In the same reaction set-up as described in Example 1, 916.7 g of a terminal vinylsiloxane polymer with an average molecular weight of 31,000 g/mole, a viscosity of 1,000 mPa·s at 20° C. and a solids content (determined by means of GPC at 140° C.) of 99.5%, together with 73.9 g of a third organosiloxane with terminal H—Si bonds having a molecular weight of 816 g/mole, a viscosity of 15 mPa·s and a hydrogen content of 1,400 ppm, 1.802 g of a siloxane having terminal and pendant H—Si bonds with a molecular weight of 2,110 g/mole, a viscosity of 500 mPa·s at 20° C. and a hydrogen content of 1,715 ppm, and 7.5 g of vinyltrimethoxysilane having a molecular weight of 148 g/mole were mixed together.

The mixture was heated at 50° C. At this temperature, 5 ppm platinum in the form of Karstedt's catalyst was added. Subsequently, the temperature was increased to 100° C. and maintained for 2 hours. After the reaction mixture had cooled down to room temperature, the hydrogen content in the form of H—Si bonds of the product obtained was determined. The hydrogen content was zero, whereby it could be demonstrated that the hydrosilylation reaction had run to completion. The polymer obtained had a molecular weight of 49,800 g/mole (determined by means of GPC), a solids content of 99.85% by weight, and a viscosity of 5,100 mPa·s. These values correspond to the values calculated on the basis of the selected starting compounds. The product corresponds to a product of the following formula 2:

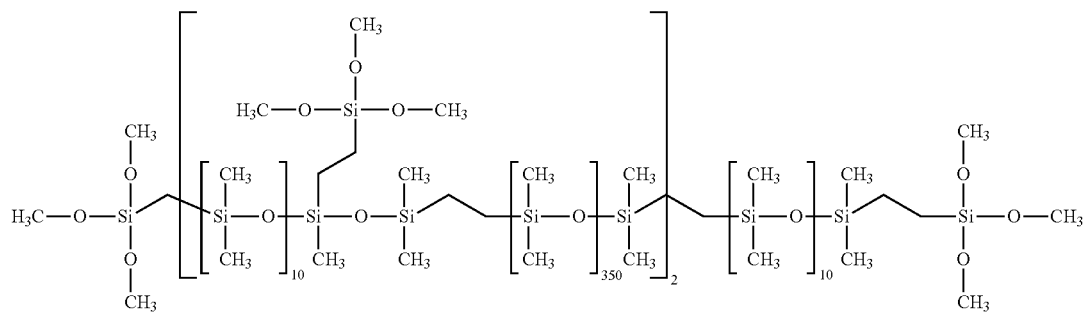

In a further cross-linking reaction, the product obtained could be cured to a gel. The siloxane prepared was optically transparent.

Example 3

By analogy with Example 1, 916.9 g of a siloxane polymer with terminal vinyl groups (molecular weight 31,000 g/mole, viscosity 1,000 mPa·s at 20° C., solids content 99.5% by weight at 140° C.), 78.5 g of organosiloxane with terminal hydrogen atoms (average molecular weight 816 g/mole, viscosity 15 mPa·s, hydrogen content 1,400 ppm), and 3.7 g of vinyltrimethoxysilane (molecular weight 148 g/mole) were mixed together.

The mixture was heated at 50° C. At this temperature, 5 ppm platinum in the form of Karstedt's catalyst was added. After the temperature had been increased to 100° C. and the mixture stirred at this temperature for 2 hours, the mixture was cooled down to room temperature. The hydrogen content of the product obtained was determined. It was zero, so that it can be considered that the hydrosilylation had run to completion.

The polysiloxane obtained had a molecular weight of 112,000 g/mol (determined by means of GPC), a solids content of 99.85% by weight, and a viscosity of 51,000 mPa·s. The values are in agreement with values calculated beforehand.

The product corresponds to a product of the following formula 3:

The product obtained did not show any turbidity, but was optically clear. In further cross-linking reactions, it could be processed further into a gel.

The invention claimed is:

1. A process for producing alkoxyalkylsilane-modified polysiloxanes of the following general formula P:

Formula P

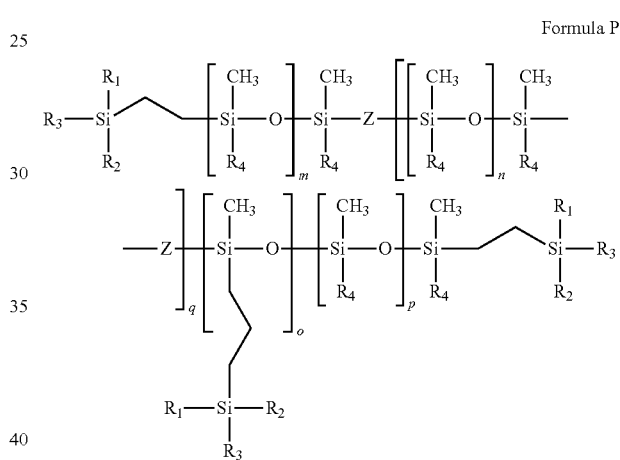

in which, independently of one another:

$R_1$ represents $R_2$ or $OR_5$, wherein $R_5$ is a hydrogen (H) atom or a linear or branched, saturated or unsaturated, optionally substituted hydrocarbon radical with 1 to 8 carbon atoms, and $R_5$ represents a monovalent hydrocarbon radical with 1 or 2 carbon atoms;

$R_2$ represents $R_1$ or an oxime radical of formula —O—N=C—$R_7$, wherein $R_7$ is a linear hydrocarbon Formula 3

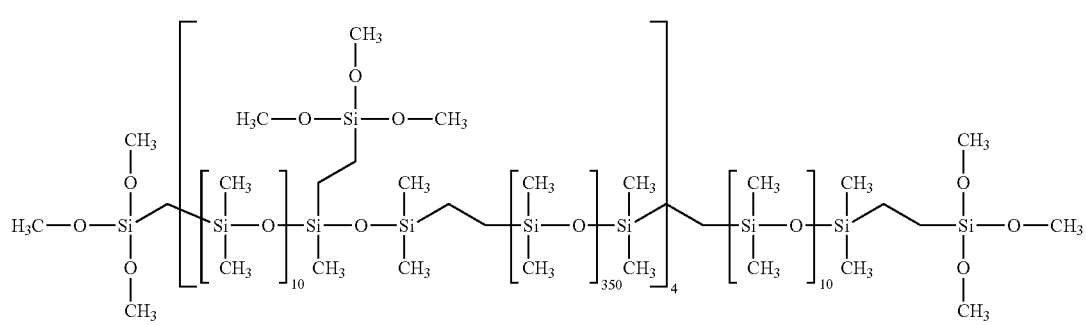

radical with 4 carbon atoms, or a cyclic hydrocarbon radical with 6 carbon atoms;

$R_3$ is $R_1$ or $R_2$ or a monovalent SiC-bonded saturated hydrocarbon radical with 1 to 8 carbon atoms, or a hydrocarbon radical with a terminal carbon-carbon double bond with 2 carbon atoms;

$R_4$ is an aliphatic hydrocarbon radical with 1 to 30 carbon atoms, a phenyl radical, and/or a polyether radical of general formula $(CH_2)_3O(C_2H_4O)_w(C_3H_6O)_x(C_4H_8O)_yQ$, in which w, x, y are independently the same or different and respectively represent a number from 0 to 50; and Q represents a hydrogen atom or an aliphatic hydrocarbon radical with 1 to 4 carbon atoms;

Z is a divalent SiC-bonded saturated hydrocarbon radical with 2 carbon atoms;

m is an integer of from 1 to 200, n is an integer of from 1 to 1000, o is an integer of from 0 to 50, p is an integer of from 1 to 50, q is an integer of from 1 to 50, wherein Formula P is produced in which a first organosiloxane (a) has two or more terminal vinyl reactive groups and a second organosiloxane (b) has at least one non-terminal reactive SiH group and terminal reactive Si—$R_6$ groups, wherein $R_6$ is a hydrogen or methyl radical are contacted and reacted with one another in the presence of an alkoxyvinylsilane (c) having a terminal vinyl reactive group, wherein the ratio of vinyl reactive groups contained in the first organosiloxane (a) and in the alkoxyvinylsilane (c) to the number of Si—H bonds in the second organosiloxane (b) is within a range of from 1.5:1 to 1:1 and characterized in that the first organosiloxane (a) is a dimethylsiloxane having two or more terminal vinyl groups bonded to silicon, of the following general formula A:

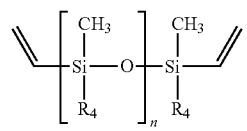

Formula A said alkoxyvinylsilane (c) has the general formula C:

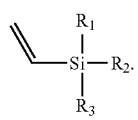

Formula C

2. The process according to claim 1, characterized in that the second organosiloxane (b) has one or more terminal and/or pendant Si—H groups, and is a molecule according to the following general formula B:

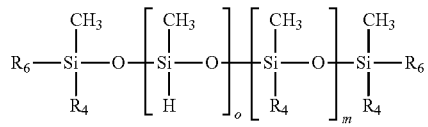

Formula B n which, independently of one another:

$R_4$ is an aliphatic hydrocarbon radical with 1 to 30 carbon atoms, a phenyl radical, and/or a polyether radical of general formula $(CH2)3O(C2H4O)w(C3H6O)x(C4H8O)yQ$, in which w, x, y are independently the same or different and represent a number from 0 to 50; and Q represents a hydrogen atom or an alkyl radical with 1 to 4 carbon atoms;

R6 is a hydrogen atom or a methyl radical;

m is an integer of from 1 to 100, and o is an integer of from 0 to 20.

3. The process according to claim 1, characterized by being performed in the presence of a catalyst (d), being a hydrosilylation catalyst containing platinum.

4. The process according to claim 3, characterized in that the catalyst (d) is employed in such an amount that the content of platinum is from 1 to 100 ppm.

5. The process according to claim 1, characterized in that the reaction is performed at a temperature within a range of from −20° C. to 200° C.

6. A silicone adhesive, silicone sealant or silicone coating agent containing the polysiloxane of claim 1.

7. The silicone adhesive, silicone sealant or silicone coating agent of claim 6, wherein said silicone adhesive, silicone sealant or silicone coating agent cures at room temperature.

8. An alkoxyalkylsilane-modified polysiloxane of the following general formula P:

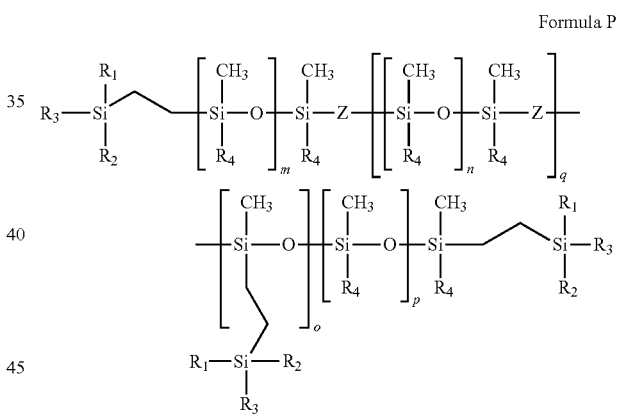

Formula P in which, independently of one another:

$R_1$ represents $R_2$ or $OR_5$, wherein $R_5$ is a hydrogen (H) atom or a linear or branched, saturated or unsaturated, optionally substituted hydrocarbon radical with 1 to 8 carbon atoms;

$R_2$ represents $R_1$ or an oxime radical of formula —O—N=C—$R_7$ wherein $R_7$ is a linear hydrocarbon radical with 4 carbon atoms, or a cyclic hydrocarbon radical with 6 carbon atoms;

$R_3$ is $R_1$ or $R_2$ or a monovalent SiC-bonded saturated hydrocarbon radical with 1 to 8 carbon atoms, or a hydrocarbon radical with a terminal carbon-carbon double bond with 2 carbon atoms;

$R_4$ is an aliphatic hydrocarbon radical with 1 to 30 carbon atoms, a phenyl radical, and/or a polyether radical of general formula $(CH_2)_3O(C_2H_4O)_w(C_3H_6O)_x(C_4H_8O)_yQ$, in which w, x, y are independently the same or different and respectively represent a number from 0 to 50; and Q represents a hydrogen atom or an aliphatic hydrocarbon radical with 1 to 4 carbon atoms;

Z is a divalent SiC-bonded saturated hydrocarbon radical with 2 carbon atoms;

m is an integer of from 1 to 200, n is an integer of from 1 to 1000, o is an integer of from 0 to 50, p is an integer of from 1 to 50, q is an integer of from 1 to 50, wherein Formula P is produced in which a first organosiloxane (a) has two or more terminal vinyl reactive groups and a second organosiloxane (b) has at least two reactive SiH group are contacted with one another in the presence of an alkoxyvinylsilane (c) having a terminal vinyl reactive group, wherein the ratio of vinyl reactive groups contained in the first organosiloxane (a) and in the alkoxyvinylsilane (c) to the number of Si-H bonds in the second organosiloxane (b) is within a range of from 1.5:1 to 1:1 and said alkoxyvinylsilane (c) has the general formula C:

Formula C

9. The polysiloxane according to claim 8, characterized by having a viscosity of from 200 mPa·s to 1,000,000 mPa·s at 20° C.

10. The polysiloxane of claim 9, wherein $R_5$ represents a monovalent hydrocarbon radical with 1 or 2 carbon atoms.

11. The polysiloxane of claim 8, wherein n is an integer of from 1-200.

12. A process for producing alkoxyalkylsilane-modified polysiloxanes of the following general formula P:

in which, independently of one another:

$R_1$ represents $R_2$ or $OR_5$, wherein $R_5$ is a hydrogen (H) atom or a linear or branched, saturated or unsaturated, optionally substituted hydrocarbon radical with 1 to 8 carbon atoms, and $R_5$ represents a monovalent hydrocarbon radical with 1 or 2 carbon atoms;

$R_2$ represents $R_1$ or an oxime radical of formula —O—N=C—$R_7$, wherein $R_7$ is a linear hydrocarbon radical with 4 carbon atoms, or a cyclic hydrocarbon radical with 6 carbon atoms;

$R_3$ is $R_1$ or $R_2$ or a monovalent SiC-bonded saturated hydrocarbon radical with 1 to 8 carbon atoms, or a hydrocarbon radical with a terminal carbon-carbon double bond with 2 carbon atoms;

$R_4$ is an aliphatic hydrocarbon radical with 1 to 30 carbon atoms, a phenyl radical, and/or a polyether radical of general formula $(CH_2)_3O(C_2H_4O)_w(C_3H_6O)_x(C_4H_8O)_yQ$, in which w, x, y are independently the same or different and represent a number from 0 to 50; and Q represents a hydrogen atom or an alkyl radical with 1 to 4 carbon atoms;

Z is a divalent SiC-bonded saturated hydrocarbon radical with 2 carbon atoms;

m is an integer of from 1 to 200, n is an integer of from 1 to 1000, o is an integer of from 0 to 50, p is an integer of from 1 to 50, q is an integer of from 1 to 50, wherein Formula P is produced in which a first organosiloxane (a) has two or more terminal vinyl reactive groups and a second organosiloxane (b) has at least two reactive SiH group are contacted and reacted with one another in the presence of an alkoxyvinylsilane (c) having a terminal vinyl reactive group, wherein the ratio of vinyl reactive groups contained in the first organosiloxane (a) and in the alkoxyvinylsilane (c) to the number of Si—H bonds in the second organosiloxane (b) is within a range of from 1.5 : 1 to 1 : 1 and characterized in that the first organosiloxane (a) is a dimethylsiloxane having two or more terminal vinyl groups bonded to silicon, of the following general formula A:

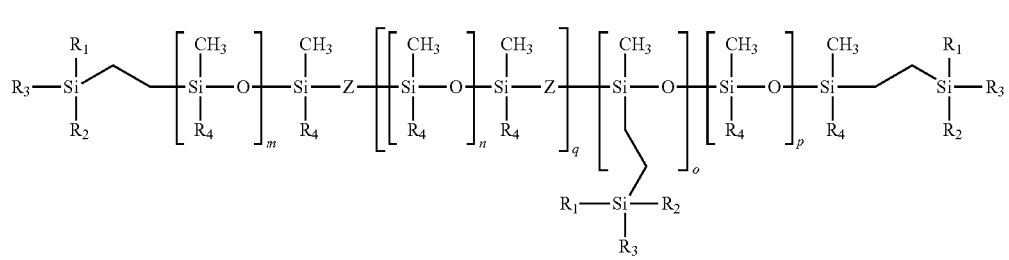

Formula P

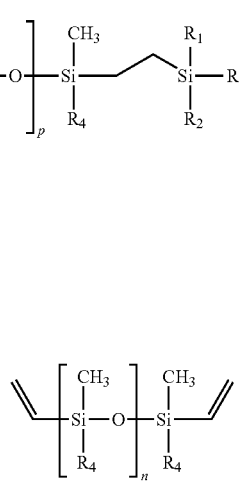

Formula A said alkoxyvinylsilane (c) has the general formula C:

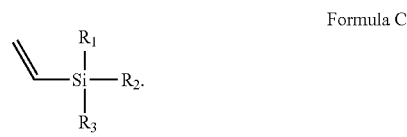

Formula C

* * * * *

UNITED STATES PATENT AND TRADEMARK OFFICE
CERTIFICATE OF CORRECTION

PATENT NO. : 9,777,120 B2
APPLICATION NO. : 14/680666
DATED : October 3, 2017
INVENTOR(S) : Petr Schurek and Friedhelm Nickel It is certified that error appears in the above-identified patent and that said Letters Patent is hereby corrected as shown below:

Column 1, Item (30) Foreign Application Priority Data:
Change "April 11, 2014 (DE) ...................... 10 2014 206 991" to
April 11, 2014 (DE) ...................... 10 2014 206 991.2

Signed and Sealed this
Seventh Day of November, 2017

Joseph Matal
*Performing the Functions and Duties of the
Under Secretary of Commerce for Intellectual Property and
Director of the United States Patent and Trademark Office*